United States Patent
Jahns et al.

(10) Patent No.: US 6,952,657 B2
(45) Date of Patent: Oct. 4, 2005

(54) INDUSTRIAL PROCESS FAULT DETECTION USING PRINCIPAL COMPONENT ANALYSIS

(75) Inventors: Gary L. Jahns, Encinitas, CA (US); YiXin Zhang, Albuquerque, NM (US); Anthony Peter Palladino, Franklin Lakes, NJ (US)

(73) Assignee: Peak Sensor Systems LLC, Albuquerque, NM (US)

( * ) Notice: Subject to any disclaimer, the term of this patent is extended or adjusted under 35 U.S.C. 154(b) by 72 days.

(21) Appl. No.: 10/658,984

(22) Filed: Sep. 10, 2003

(65) Prior Publication Data

US 2005/0055175 A1 Mar. 10, 2005

(51) Int. Cl.[7] .............................. G06F 11/30
(52) U.S. Cl. ............................ 702/182; 702/189
(58) Field of Search ................. 438/5, 8, 9; 700/90, 700/95, 108, 109, 110, 117, 121; 702/117, 118, 121, 182, 183, 185, 189, 196

(56) References Cited

U.S. PATENT DOCUMENTS

| | | | | |
|---|---|---|---|---|
| 5,642,296 A | * | 6/1997 | Saxena .................... | 702/84 |
| 5,658,423 A | * | 8/1997 | Angell et al. ............ | 438/9 |
| 5,711,843 A | * | 1/1998 | Jahns ..................... | 156/345.24 |
| 5,864,773 A | | 1/1999 | Barna et al. ............ | 702/85 |
| 6,153,115 A | | 11/2000 | Le et al. ................ | 216/60 |
| 6,192,826 B1 | | 2/2001 | Smith, Jr. et al. ...... | 118/723 |
| 6,238,937 B1 | * | 5/2001 | Toprac et al. .......... | 438/9 |
| 6,368,975 B1 | * | 4/2002 | Balasubramhanya et al. | 438/706 |
| 6,415,276 B1 | * | 7/2002 | Heger et al. ............ | 706/52 |
| 6,419,846 B1 | * | 7/2002 | Toprac et al. .......... | 216/60 |
| 6,442,445 B1 | | 8/2002 | Bunkofske et al. ...... | 700/108 |
| 6,521,080 B2 | * | 2/2003 | Balasubramhanya et al. | 156/345.24 |
| 6,564,114 B1 | * | 5/2003 | Toprac et al. .......... | 700/121 |
| 6,582,618 B1 | * | 6/2003 | Toprac et al. .......... | 216/59 |
| 6,603,538 B1 | * | 8/2003 | Oluseyi et al. ......... | 356/72 |
| 6,675,137 B1 | * | 1/2004 | Toprac et al. .......... | 703/2 |
| 2002/0104832 A1 | | 8/2002 | Tanaka et al. ......... | 219/121.41 |
| 2002/0119668 A1 | | 8/2002 | Bell ..................... | 438/707 |
| 2003/0055523 A1 | | 3/2003 | Bunkofske et al. ..... | 700/108 |
| 2003/0136511 A1 | * | 7/2003 | Balasubramhanyha et al. | 156/345.25 |

OTHER PUBLICATIONS

White, D; Boning, D; Butler, S; Brna, G; "Spatial characterization of wafer state using principal component advanced analysis of optical emission spectra in plasma etch"; IEEE Transactions on Semiconductor Manufacturing; vol. 10, Issue 1; 1997; pp 52–61.*

(Continued)

*Primary Examiner*—Bryan Bui
*Assistant Examiner*—Douglas N Washburn
(74) *Attorney, Agent, or Firm*—Marsh Fischmann & Breyfogle LLP

(57) ABSTRACT

A method and system for use in monitoring/evaluating industrial processes such as, for example, plasma processes are provided. In one embodiment, a plasma process fault detection module (100) includes multiple sub-modules. A data selection sub-module (101) obtains selected optical emissions spectra (OES) data for each wafer that is processed. A model building/updating sub-module (102) constructs multiple models from the OES data for a number of wafers. A principal component analysis (PCA) analysis sub-module (103) utilizes PCA techniques to determine whether the OES data for a particular wafer differs significantly from an expected normal wafer as represented by the models. A model maintenance sub-module (104) saves and retrieves models for different processes, associating the current wafer with the correct process. A wafer categorization sub-module (105) categorizes each wafer based on a scalar metric characterizing the residual spectrum vector. A data output sub-module (106) outputs the results to a user.

45 Claims, 8 Drawing Sheets

OTHER PUBLICATIONS

Martin, E.B.; Morris, A.-I.; Zhang, J.; "Process performance monitoring using multivariate statistical process control"; IEE Proceedings Control Theory and Applications; vol. 143, Issue 2; pp 132–144.*

Lennox, B; "Recent experiences in the industrial exploitation of principal component based fault detection methods"; Proceedings IEEE International Symposium on Computer Aided Control System Design; Sep. 18–20, 2002; pp x.*

Weighell, M.; Martin, E.B.; Morris, A.J.; "Fault diagnosis in industrial process manufacturing using MSPC"; IEE Colloquium on Fault Diagnosis in Process Systems (Digest No: 1997/174); Apr. 1997; pp 4/1–4/3.*

Martin, E; Morris, A; "Multivariate statistics and neural networks in process fault detection"; IEE Colloquium on Qualitative and Quantitative Modelling Methods for Fault Diagnosis; Apr. 24, 1995; pp 7/1–7/8.*

Yinghua, Y; Ningyun, L; Fuli, W; Liling, M; "A new fault detection and diagnosis method based on principal component analysis in multivariate continuous processes"; Prcdngs 4th Wrld Cngrss on Intllgnt Cntrl and Auto; vol. 4; Jun. 10–14, 2002; pp 3156–3160.*

Infineon Technologies, "Using Multi Way PCA (MPCA) for Advanced Monitoring and Diagnosis for Plasma Processing Based on Optical Emission Spectroscopy" by Zimppel et al., Sematech AEC/APC Symposium XII, (Sep. 24–28, 2000).

Infineon Technologies, "Supervision of Plasma Processes Using Multi–Way Principal Component Analysis" by Knobloch et al, IVC–15 Int'l Symposium. (Oct. 02–06, 2000).

Eigenvector Research Inc., "Development and Benchmarking of Multivariate Statistical Process Control Tools for a Semiconductor Etch Process: Improving Robustness Through Model Updating" by Gallagher et al. (1997).

* cited by examiner

INDUSTRIAL PROCESS FAULT DETECTION USING PRINCIPAL COMPONENT ANALYSIS

FIELD OF THE INVENTION

The present invention relates generally to the field of evaluating the progress and efficacy of industrial processes by analyzing (in real time) the data streams produced by sensors that monitor the processes, and more particularly to monitoring/evaluating plasma processes useful in the fabrication of semiconductor microelectronic circuits, microelectromechanical devices, and the like.

BACKGROUND OF THE INVENTION

Industrial processes used for the manufacture of a wide variety of valuable goods are often automated such that the processing equipment performs without direct control of human operators. Sensors are typically utilized in such situations to measure aspects of the processing operation, either for direct feedback control, or for confirmation that processing conditions are within established norms.

Plasma is used in various types of industrial processes in the semiconductor and printed wiring board industries, as well as in various other industries such as in the medical equipment and automotive industries. One common use of plasma is for etching away materials in an isolated or controlled environment. Various types of materials may be etched by one or more plasma compositions, including glasses, silicon or other substrate materials, organics such as photoresist, waxes, plastics, rubbers, biological agents, and vegetable matter, and metals such as copper, aluminum, titanium, tungsten, and gold. Plasma is also utilized for depositing materials such as organics and metals onto an appropriate surface by various techniques, such as via chemical vapor deposition. Sputtering operations may also utilize plasmas to generate ions which sputter away material from a source (e.g., metals, organics) and deposit these materials onto a target such as a substrate. Surface modification operations also use plasmas, including operations such as surface cleaning, surface activation, surface passivation, surface roughening, surface smoothing, micromachining, hardening, and patterning.

Plasma processing operations can have a significant effect on a company's profit margin. This is particularly true in the semiconductor and printed wiring board industries. Consider that a single semiconductor fabrication facility may have up to 200–300 processing chambers and that each processing chamber in commercial production may process at least about 15–20 wafers per hour. Further consider that an eight inch wafer which is processed in one of these chambers in some cases may be used to produce up to 600 individual semiconductor chips which are each worth at least about $125, and that each of these semiconductor chips are in effect "pre-sold." Therefore, a single wafer which has undergone an abnormal plasma process and which is scrapped can result in lost revenues of at least about $75,000.

The particular plasma process which acts on the wafer such that a semiconductor device may be formed therefrom is commonly referred to as a plasma recipe. Plasma processes may be run on wafers in a commercial production facility in the following manner. A cassette or boat which stores a plurality of wafers (e.g., 25) is provided to a location which may be accessed by a wafer handling system associated with one or more processing chambers. One wafer at a time is processed in the chamber, although some chambers may accommodate more than one wafer at a time for simultaneous plasma processing. One or more qualification wafers may be included in each cassette, and the rest are commonly referred to as production wafers. Both the qualification and production wafers are exposed to the same plasma process in the chamber. However, no semi-conductor devices are formed from a qualification wafer as qualification wafers are processed and retained solely for testing/evaluating the plasma process, whereas semiconductor devices are formed from the production wafers. Further processing operations of these now plasma processed production wafers are required before semiconductor devices are actually formed from such production wafers.

Monitoring is employed in connection with many plasma processes to evaluate one or more aspects of the process. One common monitoring technique associated with plasma recipes run on wafers is endpoint detection. Endpoint detection is concerned with identifying when one or more steps of a given plasma recipe is/are complete, or more specifically that point in time when the predetermined result associated with a plasma step has been produced on the product (e.g., when a layer of a multi-layered wafer has been completely removed in a manner defined by a mask or the like). Many endpoint detection techniques operate by identifying the point in time when the intensities of particular wavelengths or spectral bands of optical energy emitted from the plasma processing chamber change. Such intensity changes result, for example, from a layer being completely etched away and material from a lower, different layer beginning to be removed and dispersed within the chamber, as well as, for example, various gases used in the plasma process no longer being consumed at the same rate when the layer is substantially removed.

As such, typical endpoint detection techniques are not concerned with identifying abnormal conditions that may occur during the processing of a particular wafer nor evaluating trends that may be occurring within a processing chamber over time as multiple wafers are processed in accordance with a particular plasma recipe. Commonly used endpoint detection techniques provide no information on how the plasma process has actually proceeded or the "health" of the plasma process—only if and when an endpoint of the subject plasma step has been reached. Other monitoring techniques that are commonly used in plasma processes suffer from this same type of deficiency. Pressures, temperatures, and flow rates of the feed gases used to form the plasma are commonly monitored. Various aspects relating to the electrical system associated with the plasma are also monitored, such as the power settings being utilized since this will affect the behavior of the plasma. However, these types of monitoring operations do not necessarily provide an indication of how the plasma process is actually proceeding. All of the "hardware" settings may be correct, but still the plasma may not be performing properly for a variety of reasons (e.g., an "unhealthy" plasma). Since errors in a plasma process are typically detected by some type of post processing, destructive testing technique, multiple wafers are typically exposed to the faulty plasma process before the error is actually identified and remedied resulting in many wafers that need to be scrapped at great cost.

In addition to endpoint detection techniques, various techniques are known for monitoring the "health" of a plasma process as it is performed on a group of wafers. One such plasma health monitoring technique relies on pattern recognition techniques to determine if optical spectra from the processing chamber match at least one previously stored "normal" or "healthy" spectrum. As may be appreciated, such techniques can be quite computationally intensive due to the amount of spectral data involved and also require the establishment of normal spectra which may be searched for a match. In one known plasma process monitoring technique, principal component analysis (PCA) has been used to reduce the amount of spectral data that must be processed to a more manageable size.

SUMMARY OF THE INVENTION

Accordingly, one object of the present invention is to provide a more accurate indication of how an entire industrial process, such as a plasma process, has proceeded on a more "real-time" basis, and thereby allow for a reduction in the number of product units (e.g., semiconductor wafers) that are exposed to abnormal processes.

Another object of the present invention is to provide for the identification of the existence of an error in an industrial process, such as a plasma process, at least before the next product unit (e.g., a semiconductor wafer) is exposed to such an abnormal process.

In accordance with the present invention, a method for monitoring an industrial process involves obtaining sensor data corresponding to a plurality of product units as the industrial process is performed on the product units, building one or more models of the industrial process from the sensor data as the sensor data is obtained, performing a principal components analysis on the model(s) to identify significant features present in the sensor data included in the model(s), using the results of the principal components analysis to generate residual data vectors representing the difference between expected sensor data for a product unit and the actual sensor data for a product unit, and obtaining information from the residual data vectors relating to the industrial process.

In accordance with the present invention, a system for use in monitoring industrial processes includes a data selection module for obtaining one or more data scans for each product unit as an industrial process is performed on a group of product units, a sample matrix building module for building one or more sample matrices of the process from the data scans as the scans are obtained with each sample matrix and principal singular vectors thereof comprising a model, a PCA analysis module for performing a principal components analysis on the model(s) to identify significant features present in the data included in the model(s) and using the results of the principal components analysis to generate residual data vectors representing the difference between an expected data scan for a product unit and an actual data scan for a product unit, a model maintenance module operable to identify a process and store and retrieve model data associated with the identified process, and a product unit categorization module for categorizing each product unit based on information (e.g., a scalar metric) obtained from the residual data vectors.

In one embodiment of the present invention, the industrial process is a plasma process, the product units are semiconductor wafers, and the sensor data obtained comprise one or more optical emissions spectra (OES) data scans (also referred to herein as data vectors) for each wafer. In other embodiments, the industrial process may comprise other processes used in various industries such as the semiconductor, automotive, or pharmaceutical industries, for example, a deposition process, an ion-implant process, a micro-machining process, a wet cleaning process, a wet plating process, a plastic forming process, a solvent cleaning process, a painting process, or a coating process, and the sensor data may, for example, comprise electrical sensor data, radio-frequency (RF) sensor data, or residual gas analysis (RGA) mass spectrometer data.

According to one aspect of the present invention, two types of OES scan data are obtained for each wafer. A first type of data comprises a particular OES scan taken at a particular sampling time during processing of the wafer. Such scan may be taken at the endpoint of the plasma process that is performed on the wafer. The second type of data comprises an average of a selected portion of the OES scans taken for the wafer. In this regard, OES scans taken for the wafer after the plasma process has stabilized and prior to it losing stability near the end of the process may be averaged to obtain the average OES scan for a wafer.

According to another aspect of the present invention, four categories of models are built for each plasma process recipe and for each processing chamber. A first model is comprised of the first type of data and such model is not updated after it is complete. A second model is comprised of the second type of data and such model is not updated after it is complete. A third model is comprised of the first type of data and such model is updated after it is complete. A fourth model is comprised of the second type of data and such model is updated after it is complete. In this regard, all four models may be considered complete when a predetermined number of OES scans are included in the models. The third and fourth model may be updated by deleting scans corresponding to a wafer processed earlier in time and adding scans corresponding to a wafer processed later in time.

According to a further aspect of the present invention, unique models are maintained corresponding to a multiplicity of recipes being run in a particular processing chamber, and also corresponding to one of several processing chambers being monitored. It is typical for the wafers in a cassette to be distributed by the wafer handling system to different chambers. As the sensor data from different chambers may contain different characteristics, but each is nonetheless "normal" for that chamber, the present invention accounts for chamber-to-chamber variability by maintaining separate models. Also, the process recipe, determined by the requirement for each incoming wafer, may change. The present invention associates unique models (one of each category) with the recipe in use, and changes the models in use when the recipe changes.

According to a further aspect of the present invention, the residual spectrum vectors for each model are reduced to scalar values in order to obtain a metric that characterizes the plasma process. In this regard, the standard deviation of the data in each residual spectrum vector is calculated. In a related aspect, the standard deviations are normalized by dividing the single-wafer standard deviation by an average standard deviation for the process.

According to yet another aspect of the present invention, the normalized standard deviations of the residual spectrum vectors are utilized to assess whether the plasma process has been properly performed for each wafer. In this regard, each wafer may be assigned to one of three categories (e.g., normal, warning, failure) based on how the normalized standard deviation relating thereto compares with a value of unity.

According to an additional aspect of the present invention, the category assigned to each wafer may be utilized to assess the validity of an endpoint of a plasma-processing step that has been determined by a separate endpoint determination technique. In this regard, if the plasma process has been determined to have failed for a particular wafer, then the endpoint may be considered to be improperly determined. If the plasma process has been determined to be in the warning category for a particular wafer, then the endpoint may be considered to be questionable and in need of further assessment. If the plasma process has been determined to be normal for a particular wafer, then the endpoint may be considered to be reliable.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Plasma Monitoring Assembly

Figure 1:
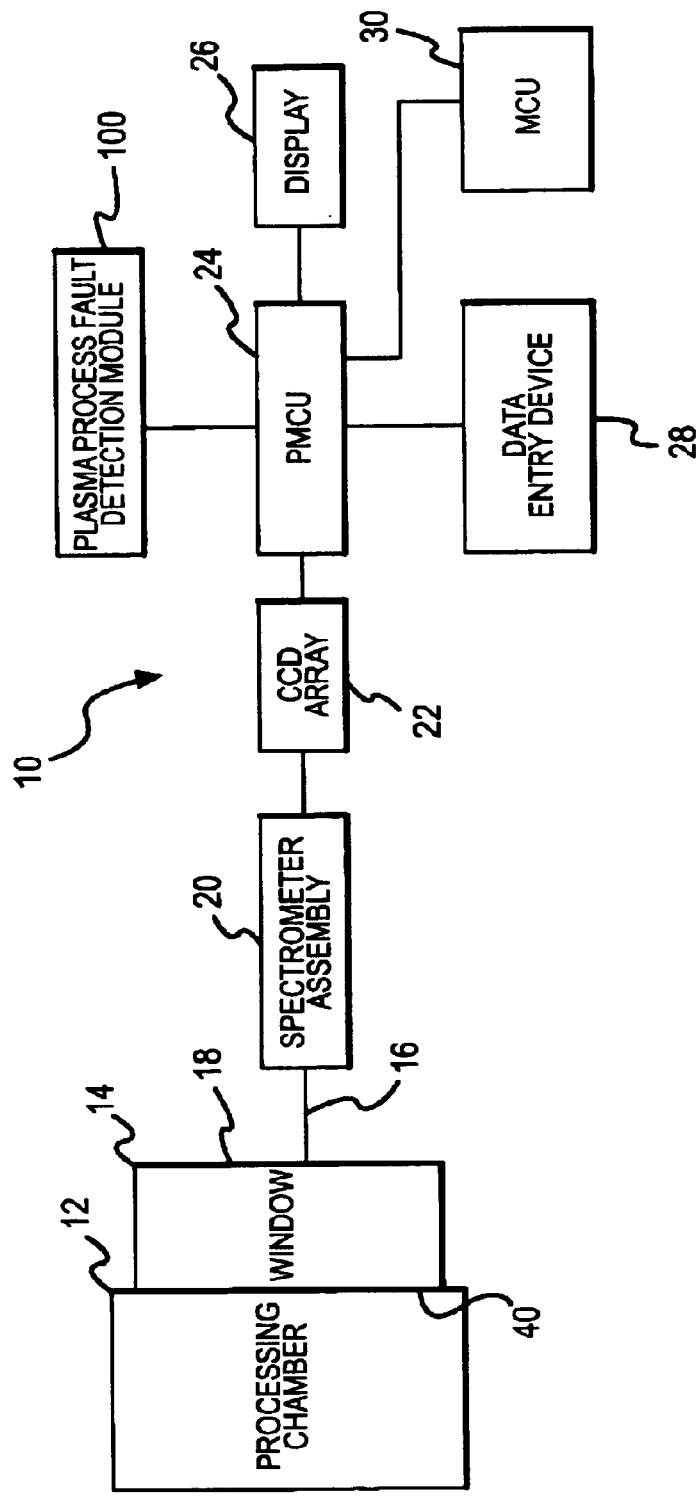
FIG. 1 is a schematic diagram of one embodiment of a plasma monitoring assembly in which a plasma process fault detection module in accordance with the present invention may be implemented.

Referring to FIG. 1, there is shown one embodiment of an assembly for monitoring/evaluating plasma processes (hereafter "plasma monitoring assembly 10") that may be used to collect optical emissions spectra (OES) data from a plasma process conducted within a plasma processing chamber 12 of a wafer production system. In other embodiments, sensors other than those of OES may be used. The plasma monitoring assembly 10 operatively interfaces with a window 14 of the plasma processing chamber 12 by receiving optical emissions of the plasma which pass out of the processing chamber 12 through the window 14. These optical emissions are "collected" by an appropriate fiber optic cable 16, one end of which is positioned at or near the outer surface 18 of the window 12. Optical emissions of the plasma within the processing chamber 12 during processing of a wafer therein enter the fiber optic cable 16 and are directed to a spectrometer assembly 20. Both scanning-type and solid state spectrometers may be used as the spectrometer assembly 20. The spectrometer assembly 20 may also include one or more appropriately interconnected spectrometers, each of which obtains optical emissions data from a different region. The spectrometer assembly 20 separates these optical emissions into a plurality of individual wavelengths and, in one embodiment, provides these separate optical components to an array 22 of charge coupled devices (hereafter "CCD array 22") for conversion to a corresponding computer-readable electrical signal. The computer-readable electrical signal is provided by the CCD array 22 to a plasma monitor control unit 24 (hereafter "PMCU 24") which is the primary control mechanism of the plasma monitoring assembly 10. In one embodiment, the PMCU 24 is a computer which may be configured to include, but not limited to, at least one motherboard, at least one analog-to-digital conversion board, at least one central processing unit (CPU) for each motherboard, and one or more types of computer-readable storage mediums such as at least one floppy disk drive, at least one hard disk drive, and at least one optical media drive (e.g., a CDR, CDRW, DVDR or DVDRW drive). Other hardware may be operatively interconnected with the PMCU 24, such as a display 26 for providing visual/audio-based information to operations personnel (e.g., a CRT, LCD, or computer monitor), as well as one or more data entry devices 28 (e.g., mouse, light pen, keyboard) for allowing personnel to enter information used by or relating to the plasma monitoring assembly 10. One PMCU 24 may be provided for each chamber 12, or the PMCU 24 may be configured to service multiple chambers 12. The PMCU 24 is also operatively interfaced or interconnected with the main control unit 30 (hereafter "MCU 30") of the wafer production system including the plasma processing chamber 12 such that the PMCU 24 and MCU 30 may communicate with each other.

The PMCU 24 is operable to execute the instructions of a plasma process fault detection module 100. The PMCU 24 may also be operable to execute other modules, such as, for example a plasma process endpoint determination module (not shown) useful in determining when the endpoint(s) of particular plasma process step(s) are reached. The plasma process fault detection module 100 (and other modules, if any) may be stored on a computer-readable storage medium associated with the PMCU 24 (e.g., on a portable computer diskette(s), on a hard drive, on a CD(s), on a DVD(s)). The plasma process fault detection module 100 facilitates the monitoring or evaluation of the various types of plasma processes which may be conducted within the processing chamber 12 through the evaluation of OES data from the plasma in the chamber 12. In the case of plasma monitoring assembly 10 of the FIG. 1, OES data are collected and delivered by the fiber optic cable 16 to the spectrometer assembly 20 which divides the light up into its individual optical components. Data representative of these optical emission components are then made available to the PMCU 24 and thereby to the plasma process fault detection module 100 via the CCD array 22 as described above.

Evaluation or monitoring of the current plasma process through the plasma process fault detection module 100 is facilitated by collecting optical emissions from the plasma preferably to include at least wavelengths from within the UV range to within the near infrared range, and thereby including the visible light spectrum. In one embodiment, optical emissions of the plasma in the processing chamber 12 which are obtained and available for evaluation include at least those wavelengths from about 200 nanometers to about 1,000 nanometers (inclusive), and more preferably at least those wavelengths from about 150 nanometers to about 1,200 nanometers (inclusive). Hereafter the above-noted desired range or bandwidth of optical emissions data which are obtained/collected from the plasma in the chamber 12, and which includes each of the above-noted ranges or bandwidths, will be referred to as the "Preferred Optical Bandwidth."

Optical or wavelength resolutions within and throughout the Preferred Optical Bandwidth are preferably no more than about 1 nanometer, and even more preferably no more than about 0.5 nanometers. The term "wavelength resolution" in this context means the amount of separation between adjacent wavelengths in the subject optical emissions data that are collected. Therefore, if the wavelength resolution being used to collect optical emissions data from the plasma in the chamber 12 is 1 nanometer, no more than a 1 nanometer spacing will exist between any two data points within and throughout the Preferred Optical Bandwidth. It is typical, due to the optical characteristics of the spectrometer, for the wavelength resolution to vary fractionally over the range of the Preferred Optical Bandwidth. Hereafter, the above-noted magnitude for the optical or wavelength resolution will be referred to as the "Preferred Data Resolution," meaning that at no point in the Preferred Optical Bandwidth does the resolution exceed this value.

Another factor relating to the effectiveness of the plasma process fault detection module 100 is the frequency with which OES data is obtained from the plasma in the chamber 12. OES data are preferably obtained at least once per every second, and more preferably more frequently than once per every second from the plasma in the chamber 12. Although equal time intervals will typically be utilized in relation to the times at which OES data is collected from the plasma in the chamber 12, this need not be the case such that equal time intervals, unequal time intervals, and combinations thereof may be utilized. Hereafter, the above-noted sampling frequencies for obtaining OES data from the plasma in the chamber 12 will be referred to as the "Preferred Sampling Frequency".

The spectrometer assembly 20 illustrated in FIG. 1 should be capable of meeting the above-noted criteria for the Preferred Optical Bandwidth, Preferred Data Resolution and Preferred Sampling Frequency, and a number of implementations may be utilized. For instance, the spectrometer assembly 20 may consist of an optical dispersive element such as a grating and a solid state device consisting of a linear array of from 512 to 2048 detection elements. Alternatively, multiple solid-state linear arrays may be oriented in the dispersive pattern to fully cover the Preferred Optical Bandwidth while achieving the Preferred Data Resolution. The spectrometer assembly 20 may also be of the scanning type in which the dispersive element is moved such as to scan the spectrum across a single detector to obtain data encompassing the Preferred Optical Bandwidth using the Preferred Data Resolution and at the Preferred Sampling Frequency.

Regardless of how it is generated, the raw OES data for a wafer includes multiple scans or vectors of values representing the intensity of selected wavelengths as determined by the Preferred Data Resolution within the Preferred Optical Bandwidth taken at the sampling times determined by the Preferred sampling frequency.

Plasma Fault Detection Module

Figure 2:
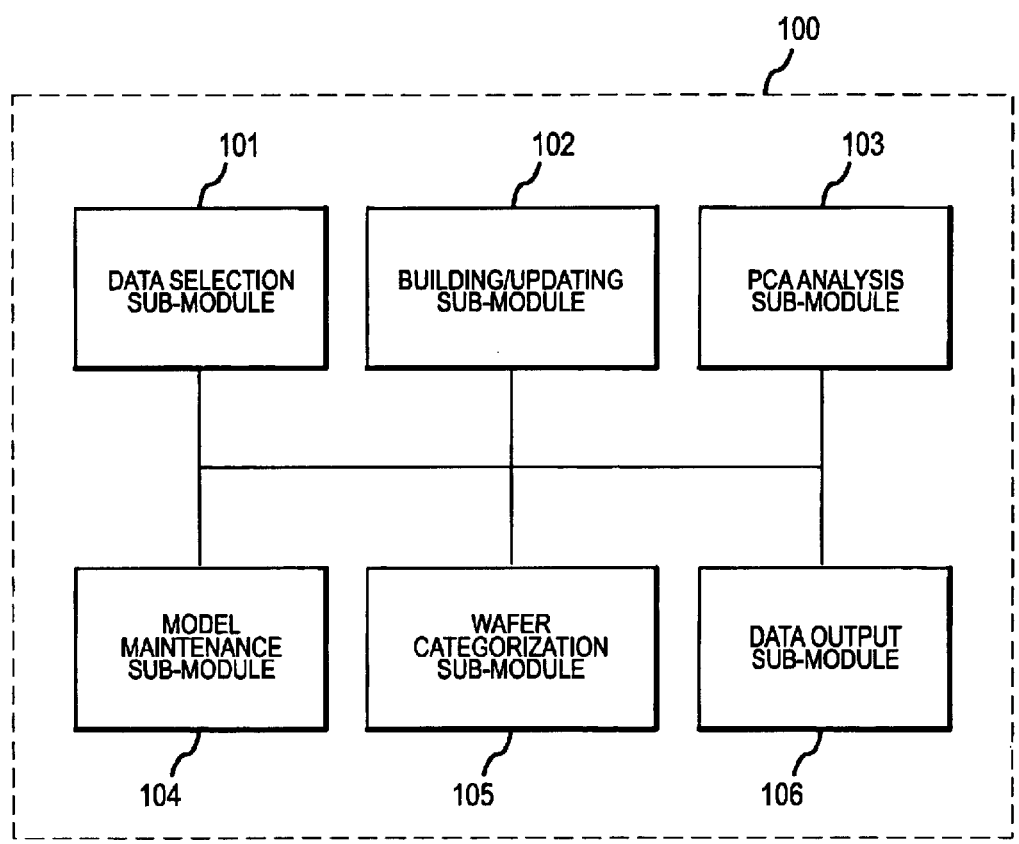
FIG. 2 is a block diagram providing an overview of various sub-modules included in one embodiment of a plasma fault detection module in accordance with the present invention.
Figure 3A:
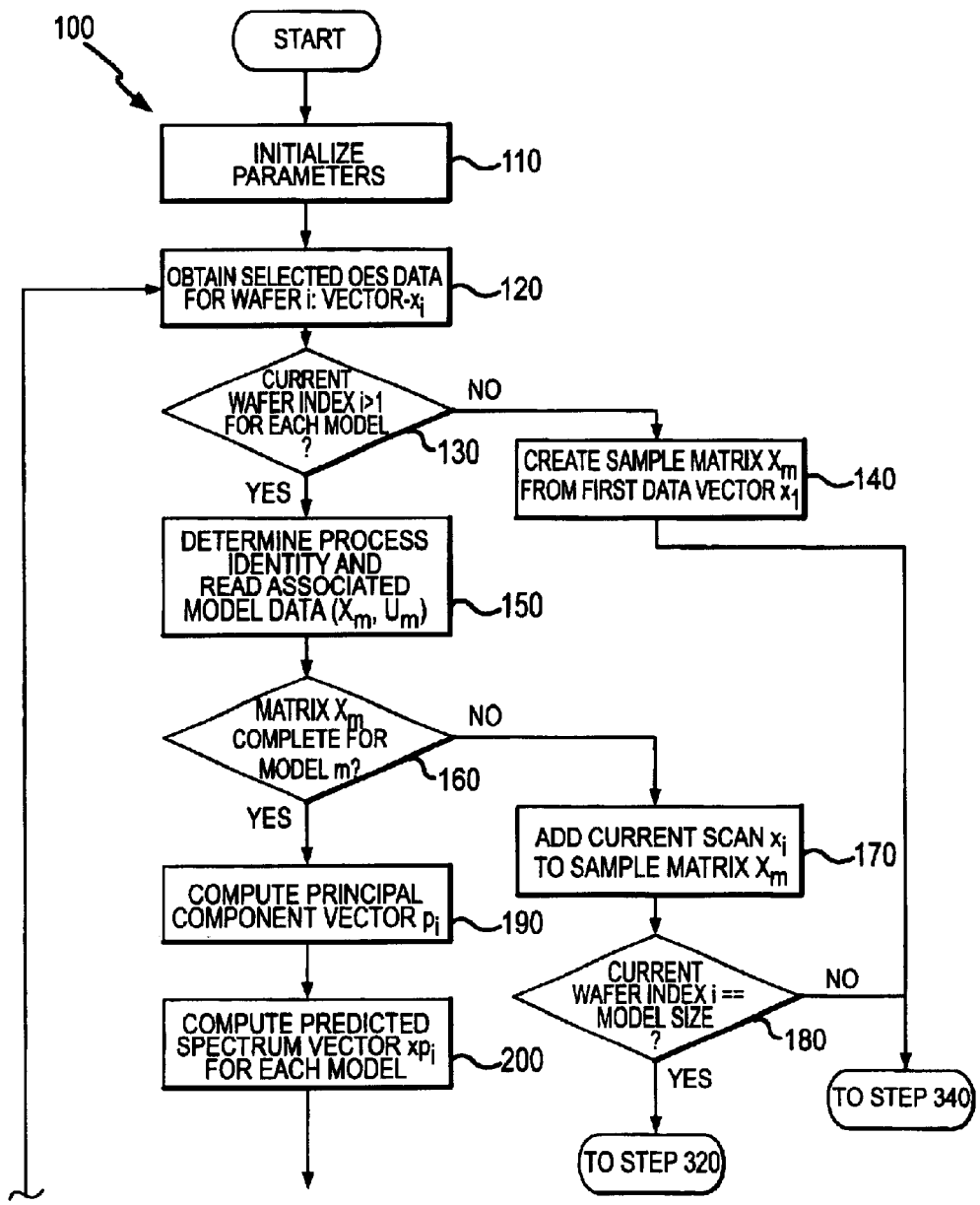
FIGS. 3A–D are flowcharts showing various information-processing steps included in one embodiment of a plasma process fault detection module in accordance with the present invention.
Figure 3B:
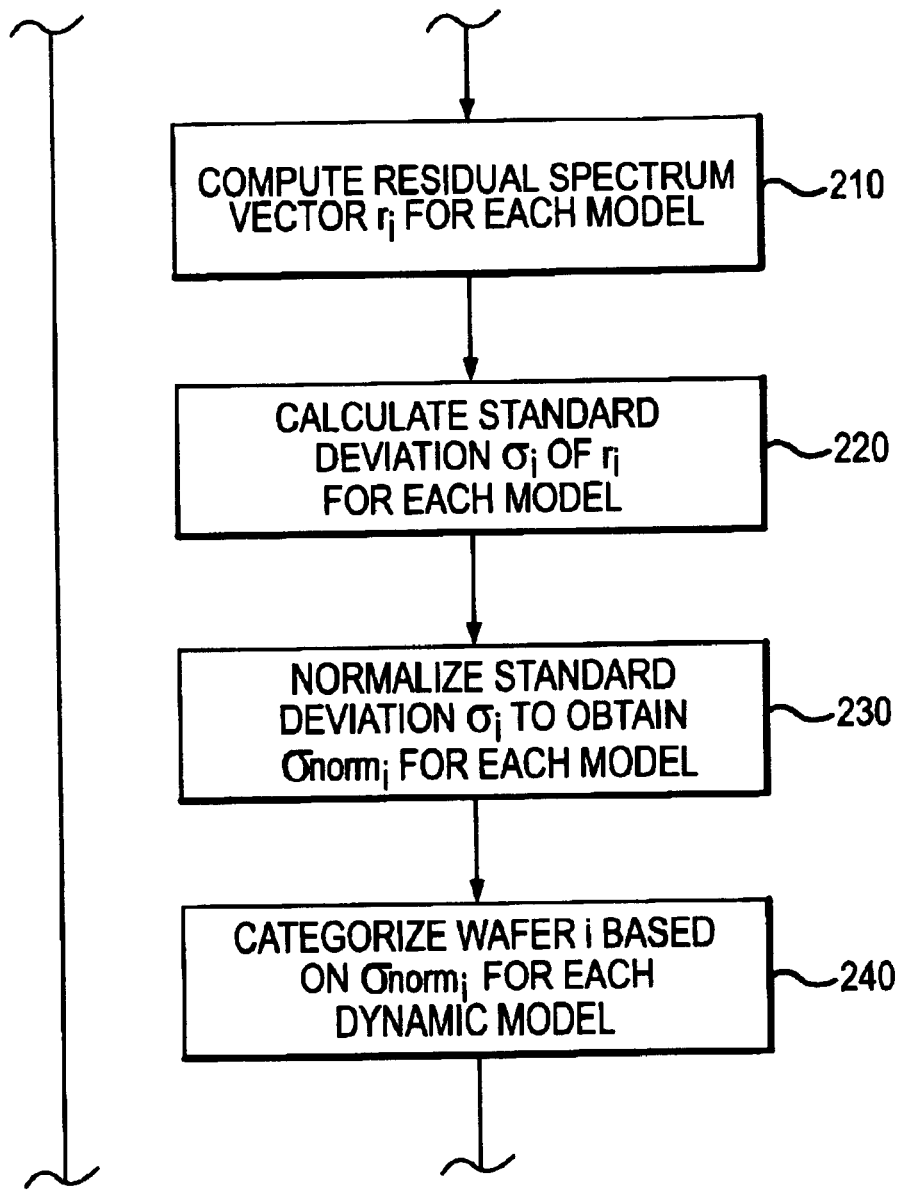
Figure 3C:
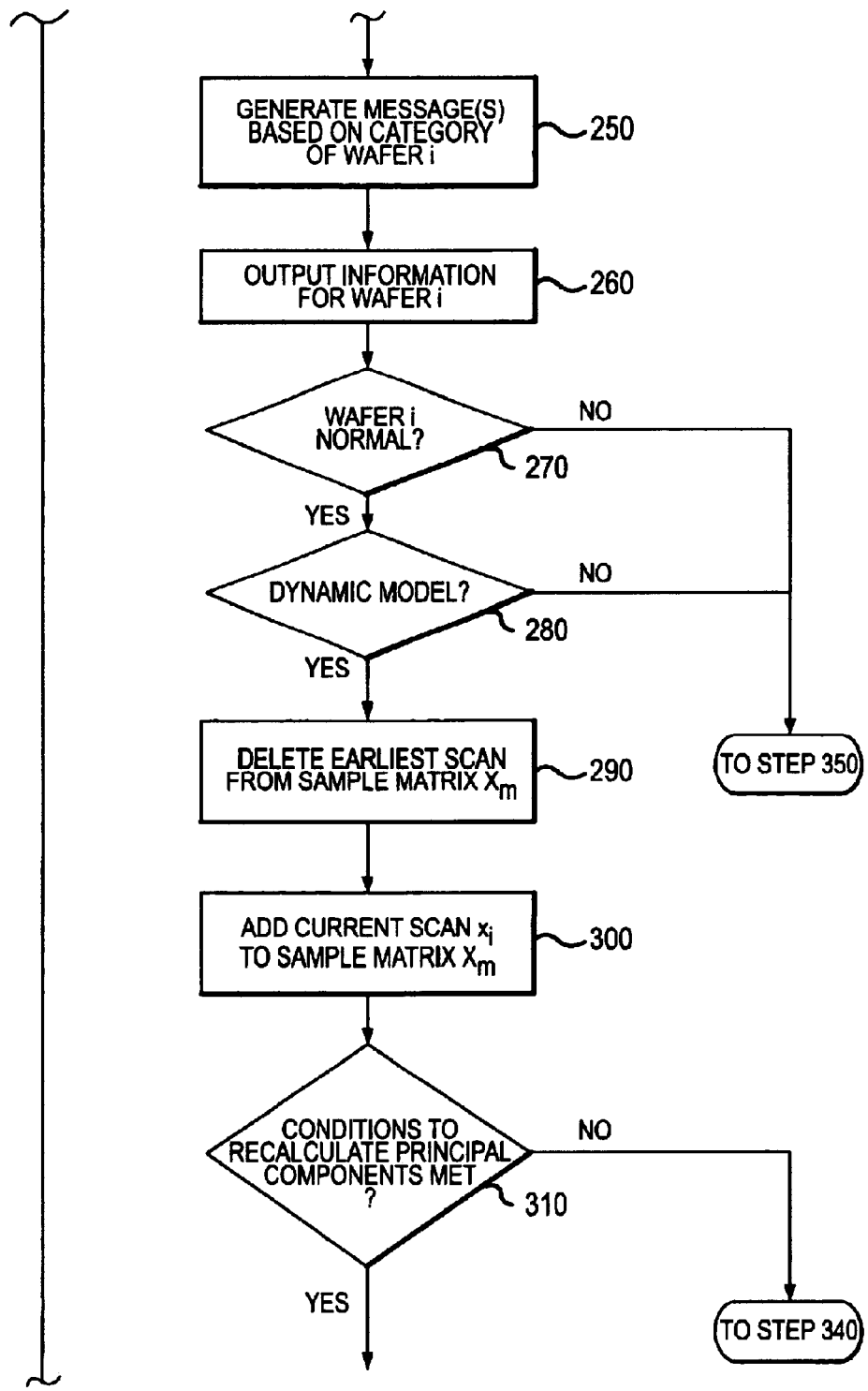
Figure 3D:
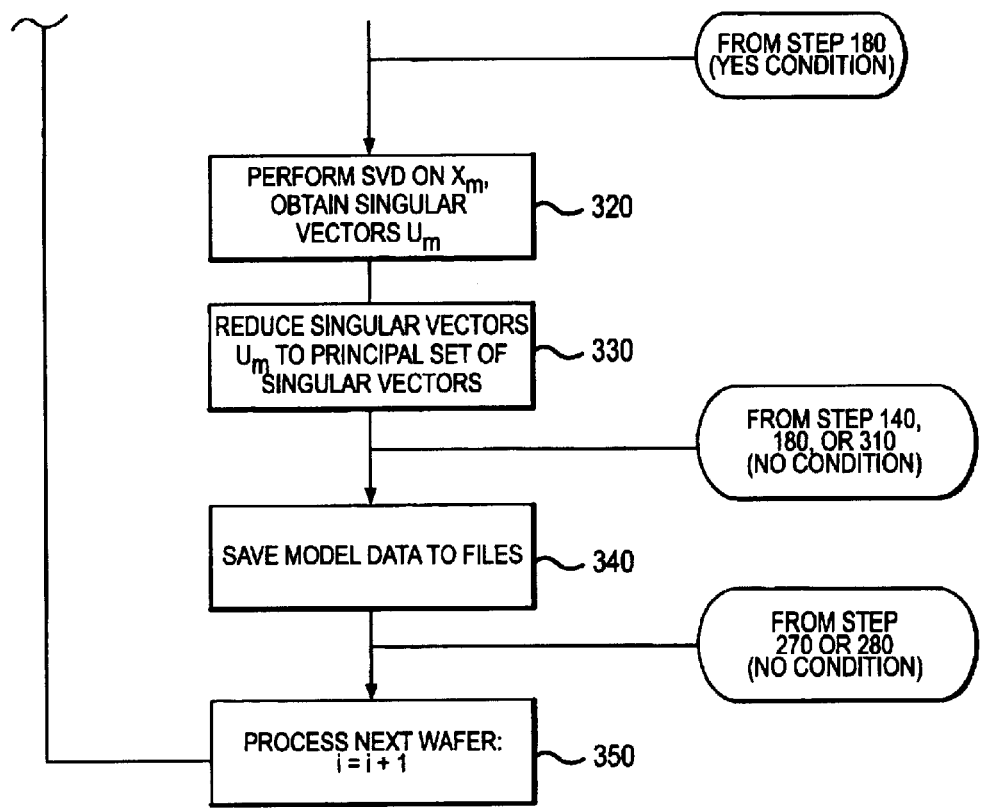

Referring now to FIG. 2, there is shown a block diagram providing an overview of the plasma process fault detection module 100 and a number of sub-modules or functions included in the plasma process fault detection module 100. In the present embodiment, the plasma process fault detection module 100 is implemented as a computer software program that is executable by the microprocessor of the PMCU 24. In other embodiments, the plasma fault detection module 100 might be implemented in hardware such as, for example, an application specific integrated circuit (ASIC) or a field programmable gate array (FPGA). The plasma process fault detection module 100 employs techniques of principal component analysis (PCA) in order to evaluate OES data obtained for a plasma process performed on a group of wafers and identify potential faults that may have occurred during the plasma process.

The plasma process fault detection module 100 includes a data selection sub-module 101, a sample-matrix building/updating sub-module 102, a PCA analysis sub-module 103, a model maintenance sub-module 104, a wafer categorization sub-module 105, and a data output sub-module 106. The data selection sub-module 101 is responsible for obtaining selected OES data for each wafer that is processed. In general, selected sensor data that are obtained are referred to herein as a data vector, record or scan. In the present embodiment where the sensor data are OES data, the data vector is referred to herein as a spectrum vector. The OES data that are selected for a particular wafer may, for example, be just one scan taken at a particular sampling time, or it may, for example, be an average scan of a number of separate scans taken at multiple sampling times. In the present embodiment, two scans are obtained for each wafer. The sample-matrix building/updating sub-module 102 is responsible for constructing multiple matrices composed of multiple columns of data vectors from the selected OES data for a number of wafers. In the present embodiment, four sample matrices are constructed for each identified process. A process is identified by the chamber in which the processing takes place and by the specific process recipe being employed in the chamber. The sample matrices are representative of OES data expected from a wafer in which the identified plasma process has proceeded as expected. One or more of the sample matrices may be updated by the model building/updating sub-module 102 when more OES data becomes available as additional wafers are processed. In the present embodiment, two of the four sample matrices for each identified process are updated. The PCA analysis sub-module 103 computes the principal singular vectors from the sample matrices and utilizes PCA techniques to determine whether the selected OES data for a particular wafer differs significantly from that expected for a normal wafer as represented by the models. In this regard, PCA techniques are utilized to generate a predicted OES scan that is compared with the actual OES scan to obtain a residual spectrum vector. The model maintenance sub-module 104 saves and retrieves each model, consisting of a sample matrix and the corresponding principal singular vectors, to ensure that the data for the current wafer under process is associated with the correct identified process. In this regard, the saving and retrieving may be done from computer memory, or from a data storage device such as a hard disk drive. The wafer categorization sub-module 105 categorizes each wafer based on the residual spectrum vector. In the present embodiment, the residual spectrum vector is reduced to a scalar value, that is in turn normalized, and the wafers are categorized based on the normalized scalar values corresponding their respective residual spectrum vectors. The wafers may, for example, be categorized as being within a first range wherein the plasma process proceeded normally, within a second range considered to be an indication or warning that something may have been wrong with the plasma process, or a third category considered to be an indication that the plasma process has failed. The data output sub-module 106 is responsible for outputting the results (e.g., the normalized scalar values corresponding to the residual spectra, the category assigned to a wafer) to a user, for example on the display 26 of the PMCU 24. The data output sub-module 106 may also save the results obtained to a storage medium for subsequent processing and analysis. As may be appreciated, the responsibilities of the various sub-modules may overlap and an action undertaken by one sub-module may cause one or more other sub-modules to undertake particular actions.

Referring now to FIGS. 3A–D, there is shown a flow diagram illustrating the process steps undertaken by one embodiment of the plasma process fault detection module 100 and the various sub-modules thereof.

The plasma process fault detection module 100 procedure begins with step 110. In step 110, various parameters are initialized. Parameters that are initialized in step 110 may be of two types, non-selectable parameters that are predetermined in advance of the plasma process fault detection module 100 being run and user input parameters that are received (e.g., from the data entry device 28 of the PMCU 24) from a user of the plasma process fault detection module 100 when it is started. One such input parameter is the model size. Model size is the number of wafers for which data is included in the models that are constructed. In the present embodiment, the desired model size of the plasma process fault detection module 100 must be within predetermined lower and upper limits. Furthermore, while the model size for each recipe and chamber may differ, the present embodiment uses the same model size for each category of model for the same process and chamber in order to avoid subsequent analysis and interpretation problems that may be present in trying to analyze and compare the results from, for example, a model based on only two wafers versus a model based on one-hundred wafers. Other parameters may include specified limits for use in categorizing each wafer. In the present embodiment, such lower and upper limits for model size are 4 and 100, respectively, but in other embodiments these limits may be different or even not included. As may be appreciated, in other embodiments, some of the user input parameters may instead be non-selectable parameters, and some of the non-selectable parameters may instead be user input parameters. When step 110 is complete, the plasma process fault detection module 100 proceeds to step 120.

In step 120, selected data is obtained from raw OES data relating to a particular wafer i that has undergone a plasma process. In this regard, the raw OES data may have been generated using, for example, a plasma monitoring assembly 10 as illustrated in FIG. 1, and saved on the hard drive of the PMCU 24. Step 120 may incorporate a listener instruction that waits until raw OES data is available for wafer i. Step 120 may also incorporate an interrupt instruction that checks to see if a user of the plasma process fault detection module 100 has requested the plasma process fault detection module 100 to stop (e.g., if plasma processing of wafers has been halted).

Once raw OES data is available for wafer i, the plasma process fault detection module 100 accesses the saved raw OES data and obtains two records or scans of OES data therefrom. The first scan is referred to as the endpoint or EP scan. The EP scan comprises the OES data vector obtained at the sample time when endpoint of the plasma process is determined to have occurred (e.g. by an endpoint determination module), which may or may not be the last vector in the raw OES data. The EP scan is not necessarily used for real time endpoint determination, but rather is used to compare normal and anomalous scans for endpoint verification after the fact (i.e., after endpoint has been determined in accordance with a separate endpoint determination module). The second scan is referred to as the non-endpoint or nonEP scan. The nonEP scan comprises the average of a subset of the multiple raw OES data vectors for the wafer. In the present embodiment, the middle 60 to 80 percent of the raw OES data vectors for a wafer are averaged to obtain a single average OES data vector that comprises the nonEP scan. For example, where the raw OES data includes 100 raw OES data vectors (e.g., for a 100 second long plasma process sampled once per second), raw OES data vectors 20 through 80 (the middle 60 percent) may be averaged to obtain the nonEP scan, raw OES data vectors 10 through 90 (the middle 80 percent) may be averaged to obtain the nonEP scan, or some other subset of the 100 raw OES data vectors may be averaged to obtain the nonEP scan for a wafer. Averaging raw OES data to obtain a single nonEP scan increases the signal to noise ratio in the data by reducing the effect of random noise in the data. Averaging only a subset of the raw OES data vectors to obtain a single nonEP scan permits OES data near the beginning and the end of a plasma process when the plasma may not be stable to be ignored in obtaining the nonEP scan. Averaging the raw OES data to obtain a single nonEP scan also provides advantages in rotational type processing tools wherein the processing plasma experiences a cyclical variation. Each of the EP and nonEP scans are assigned to respective vectors $x_i(EP)$ and $x_i(nonEP)$, which hereafter may be referred to as just $x_i$.

After obtaining the current EP and nonEP scans $x_i$, it is determined in step 130 whether the current wafer index i is greater than 1. If it is determined that wafer index i is not greater than 1 then the plasma process fault detection module 100 proceeds to step 140. In step 140, sample matrices $X_m$ are created from the appropriate first EP and nonEP scan vectors $x_i$. In the present embodiment, a total of four sample matrices $X_m$ are created for each group of wafers that is processed, but in other embodiments, more or fewer sample matrices $X_m$ may be created. Subscript m is the model index, and in the present embodiment m equals 1, 2, 3 or 4. Each sample matrix $X_m$ corresponds with one of four models that are referred to herein as the static EP model, the static nonEP model, the dynamic EP model, and the dynamic nonEP model. Although the order of the models is not significant, for subsequent reference purposes, sample matrix $X_1$ corresponds with the static EP model, sample matrix $X_2$ corresponds with the static nonEP model, sample matrix $X_3$ corresponds with the dynamic EP model, and sample matrix $X_4$ corresponds with the dynamic nonEP model. In the description that follows, the sample matrix for a particular model may simply be identified as $X_m$. Each of the static and dynamic EP and nonEP sample matrices $X_m$ includes OES intensities at wavelength index values 1:nl and wafer index values 1:nw (when complete), where nl is the number of wavelengths determined by the Preferred Data Resolution as applied to the Preferred Optical Bandwidth, and nw is the number of wafers for which data is included in the models (i.e., nw equals the desired model size). After step 140, the plasma process fault detection module 100 proceeds to step 340.

If it is determined in step 130 that the current wafer index i is greater than 1, then the plasma process fault detection module 100 proceeds to step 150. In step 150, the process identity that wafer i is undergoing is determined and the data $(X_m, U_m)$ for each model associated with this process identity is read (e.g., from hard disk or random-access memory included in the PMCU 24). In the preferred embodiment, the system keeps track of multiple models for each of a plurality of processing chambers being monitored and for each of a plurality of recipes for each chamber.

Matrix $U_m$ is obtained for each model as described below in connection with step 320. After reading the model data, the plasma process fault detection module 100 proceeds to step 160.

In step 160 it is determined whether the sample matrix $X_m$ is complete for each model m. A model is considered complete when the number of individual scan vectors $x_i$ in matrix $X_m$ equals the desired model size. If it is determined in step 160 that a model is not complete, step 170 is performed. In step 170, the current EP or nonEP scan vector $x_i$ as appropriate for a particular model is added to sample matrix $X_m$ for each model that is not complete. Thereafter, it is determined in step 180 whether the current wafer index i equals the model size for a particular model. If it is determined in step 180 that the current wafer index i equals the model size (in which case sample matrix $X_m$ has been completed for the first time) then the plasma process fault detection module 100 proceeds to step 320. If it is determined in step 180 that the current wafer index i does not equal the model size (in which case sample matrix $X_m$ for a particular model is not yet complete) then the plasma process fault detection module 100 proceeds to step 340.

If it is determined in step 160 that sample matrix $X_m$ for each model m is complete, then the plasma process fault detection module 100 proceeds to step 190. In step 190, principal component vectors $p_i$ corresponding with each scan $x_i$ are computed for each model. In this regard, the principal components $p_i$ are computed in accordance with the following expression:

$$p_i = U_m^T * x_i \quad (1)$$

where superscript T indicates matrix transpose, * indicates matrix multiplication, i is the wafer index (e.g., i=1, 2, 3, etc.) and m is the model index (e.g. m=1, 2, 3, or 4 in the case of the present embodiment). It will be appreciated that step 190 is not performed for a particular model until it is determined in step 160 that its sample matrix $X_m$ is complete. However, once the model size is reached and $U_m$ is obtained for a particular model in step 320, the principal components $p_i$ corresponding with each scan $x_i$ in the model may be computed. In computing the principal components $p_i$ for the EP and nonEP models, matrix $U_m$ is determined once initially for static models, and is periodically updated for dynamic models. Conditions for updating $U_m$ and the calculation of $U_m$ are described for steps 310 and 320, below. After step 190, the plasma process fault detection module 100 proceeds to step 200.

In step 200, a predicted spectrum vector $xp_i$ is computed for each model based on the principal components $p_i$ and the current matrix $U_m$. In this regard, the predicted spectrum is computed in accordance with the following expression:

$$xp_i = U_m * p_i \quad (2)$$

where * indicates matrix multiplication, i is the wafer index number (e.g., i=1, 2, 3, etc.) and m is the model index (e.g. m=1, 2, 3, or 4 in the case of the present embodiment). In computing the predicted spectrum $xp_i$ for the static EP and nonEP models, matrix $U_m$ does not change after initial creation. In computing the predicted spectrum $xp_i$ for the dynamic EP and nonEP models, matrix $U_m$ is the periodically updated matrix for each such model, as will be described below for step 310. After step 200, the plasma process fault detection module 100 proceeds to step 210.

In step 210 a residual spectrum vector $r_i$ is computed for each model as the difference between the actual spectrum vector $x_i$ and the predicted spectrum vector $xp_i$ in accordance with the following expression:

$$r_i = x_i - xp_i \quad (3)$$

where i is the wafer index number (e.g., i=1, 2, 3, etc.). After step 210, the plasma process fault detection module 100 proceeds to step 220.

In step 220, the residual spectrum vector $r_i$ for each model is reduced to a scalar value by calculating the standard deviation of the residual spectrum vector $r_i$:

$$\sigma_i = (1/(n-1)\Sigma_k r_k^2)^{1/2} \quad (4)$$

where i is the wafer index number (e.g., i=1, 2, 3, etc.) and k is the index number of the wavelength channel of the spectrometer. After step 220, the plasma process fault detection module 100 proceeds to step 230.

In step 230, the standard deviations $\sigma_i$ obtained in step 220 for each model are normalized to obtain normalized standard deviation values $\sigma norm_i$. Normalization is accomplished by dividing each scalar standard deviation value $\sigma_i$ for a particular model by an average standard deviation value $\sigma_{average}$ for that model. In the present embodiment, the average standard deviation value $\sigma_{average}$ is first obtained for each model by averaging a first set of standard deviations comprised of the standard deviation for the first wafer through the standard deviation for the wafer having an index value i equal to the model size, and this average standard deviation is used to normalize each of the standard deviation values $\sigma_i$ up to the model size. Thereafter, the average standard deviation value $\sigma_{average}$ is obtained for each model by averaging a second set of standard deviations comprised of the standard deviation for the wafer having an index value i equal to the model size plus one through the standard deviation for the wafer having an index value i equal to the model size plus one-half of the model size, and this average standard deviation is used to normalize each of the standard deviation values $\sigma_i$ for the wafers having index value i greater than the model size. For the purpose of normalizing, only "normal" wafers are utilized. For example, where the model size selected by the user is 100 wafers, the standard deviations $\sigma_i$ for wafers 1 through 100 are normalized by dividing each such value by:

$$\sigma_{average} = (\sigma_1 + \sigma_2 + \ldots + \sigma_{100})/100 \quad (5)$$

Thereafter, the standard deviations $\sigma_i$ for wafers 101 on are normalized by dividing each such value by:

$$\sigma_{average} = (\sigma_{101} + \sigma_{102} + \ldots + \sigma_{150})/50 \quad (6)$$

As may be appreciated the average standard deviation value $\sigma_{average}$ used to normalize the standard deviation values $\sigma_{average}$ obtained for each model may be computed in many other manners. Normalization of the standard deviation values $\sigma_i$ for each model scales the results of each model so that a "normal" standard deviation value for each model is one, thereby allowing the results of each model to more easily be compared. Normalization also facilitates comparison of the results obtained for a particular process run in a particular chamber with the same process run in a different chamber on the same or different tools or the same process run in the same chamber at a later time. After step 230, the plasma process fault detection module 100 proceeds to step 240.

In step 240, the normalized standard deviation values $\sigma norm_i$ are utilized to identify whether a fault has occurred in the plasma process performed on a wafer. In the present embodiment, this categorization step 240 is only applied to the normalized standard deviation values σnorm$_i$ of the dynamic EP and nonEP models. In this regard, each normalized standard deviation value σnorm$_i$ for a particular dynamic model is categorized based upon a specified standard into one of three classes: 1) "normal"; 2) "warning"; and 3) "failure". The standard is based upon the particular normalized standard deviation value σnorm$_i$. If the value is less than or equal to a first specified amount, the wafer is categorized as being in the "normal" category. If σnorm$_i$ is greater than the first specified amount but less than or equal to a second specified amount, the wafer may be categorized as being in the "warning" category. If σnorm$_i$ is greater than the second specified amount, the wafer may be categorized as being in the "failure" category. The first and second specified amounts may be predetermined or they may be input by a user. A typical first amount is 2, and a typical second amount is 3. As may be appreciated, fewer or more categories may be defined based upon similar or different standards. After step 240, the plasma process fault detection module 100 proceeds to step 250.

In step 250, messages indicating that a particular wafer has been categorized as being within a particular category are generated. For example, when the wafer is categorized as "normal", a message indicating that such wafer is "normal" (or no message at all) may be provided, for example, on the display 26 of the PMCU 24. When the wafer is categorized as "warning", a "warning" message may be provided, for example, on the display 26 of the PMCU 24. When the wafer is categorized as "failure", a "failure" message may be provided, for example, on the display 26 of the PMCU 24. Where the PMCU 24 is attached to a local-area-network (LAN), "warning" and "failure" messages may also be emailed to user-defined parties in order to alert such parties to the "warning" and "failure" conditions. A user that has received a "warning" or "failure" message might undertake efforts to check on the process being run or halt such process before additional wafers are processed resulting in abnormal wafers that may need to be scrapped. Although automatic control of the plasma process is not implemented in the present embodiment, in other embodiments, in the case of "warning" and "failure" messages, the PMCU 24 may also be prompted to automatically send an instruction to the MCU 30 to automatically check/adjust process parameters in the case of a "warning" message or halt the process in the case of a "failure" message. After step 250, the plasma process fault detection module 100 proceeds to step 260.

In step 260, the information generated by the plasma process fault detection module 100 for wafer i is output to a user. In this regard, the information may be output on, for example, the display 26 of the PMCU 24. Information that is output may include the normalized standard deviation value σnorm$_i$ for each model as well as the category message generated in step 250 based its normalized standard deviation value σnorm$_i$. In this regard, four normalized standard deviation values σnorm$_i$, one for each model, are output, and two category messages, one for each of the dynamic models, are output. The normalized standard deviation value σnorm$_i$ for each model may be output both in the form of a number displayed on the screen as well as an ongoing plot that is updated each time a new normalized standard deviation value σnorm$_i$ is calculated. After step 260, the plasma process fault detection module 100 proceeds to step 270.

In step 270, it is determined whether wafer i is normal. Wafer i is deemed to be normal if it is categorized as being within the "normal" category in step 240. If it is determined that wafer i is normal then the plasma process fault detection module proceeds to step 280. If it is determined that wafer i is not normal (e.g., it has been categorized as being within the "warning" or "failure" categories), then the plasma process fault detection module 100 proceeds to step 350.

In step 280 it is determined whether sample matrix $X_m$ corresponds with one of the dynamic models. If it is determined in step 280 that sample matrix $X_m$ does not correspond with a dynamic model (i.e., it corresponds with one of the static models), then the plasma process fault detection module 100 proceeds to step 350. If it is determined in step 280 that sample matrix $X_m$ does correspond with one of the dynamic models, then the plasma process fault detection module 100 proceeds to step 290.

In step 290 the earliest scan vector $x_i$ (vector $x_i$ having the lowest index i) included in sample matrix $X_m$ corresponding to each of the dynamic EP and nonEP models (i.e. matrices $X_3$ and $X_4$) is deleted from its respective dynamic model sample matrix $X_m$. Thereafter, in step 300, the current EP and nonEP scan vectors $x_i$ are added to the ends of the sample matrix $X_m$ corresponding to each of the dynamic EP and nonEP models, respectively. As may be appreciated, updating of the dynamic models occurs in accordance with a first in first out (FIFO) scheme. After updating the dynamic models in steps 290 and 300, the plasma process fault detection module 100 proceeds on to step 310.

In step 310 it is determined whether conditions required in order to recalculate the $U_m$ matrix for each of the dynamic model matrices $X_3$ and $X_4$ are met. In this regard, each time that a desired portion of the data in the sample matrices $X_3$ and $X_4$ for the dynamic models has been updated in steps 290 and 300, recalculation of $U_m$ for the dynamic models may be undertaken. In the present embodiment, each time it is determined in step 310 that half of the data in the dynamic EP and nonEP model sample matrices $X_3$ and $X_4$ has been updated, the conditions required for recalculating $U_m$ for each dynamic model matrix $X_3$ and $X_4$ are met. By way of example, where the dynamic model size is 100, each time a total of 50 scans have been deleted and 50 new scans added (i.e. after scan 150 is added, after scan 200 is added, after scan 250 is added, etc.), the conditions required for recalculating $U_m$ are met. As may be appreciated, the conditions required in step 310 may differ (e.g., when a third or a quarter of the scans have been updated recalculation may be undertaken). If it is determined in step 310 that the conditions required to recalculate $U_m$ for each of the dynamic model matrices $X_3$ and $X_4$ are not met, then the plasma process fault detection module 100 proceeds to step 340. If it is determined in step 310 that the conditions required to recalculate the principal components for each of the dynamic model matrices $X_3$ and $X_4$ are met, then the plasma process fault detection module 100 proceeds to step 320.

In step 320, once a sample matrix $X_m$ for a particular model is completed for the first time (i.e. when the plasma process fault detection module has proceeded from step 180 to step 320 because it is determined in step 180 that wafer index i equals the model size) a singular value decomposition (SVD) is performed on $X_m$ for such model to obtain matrices U, S and V satisfying the relationship:

$$X_m = U_m * S_m * V_m^T \qquad (7)$$

where superscript T indicates matrix transpose, * indicates matrix multiplication, and m is the model number (e.g., m=1, 2, 3, or 4 in the case of the present embodiment). In performing the singular value decomposition on $X_m$, a thin SVD may be performed in order to reduce the amount of computations that are required. In this regard, a thin SVD is appropriate when the number of columns in $X_m$ (given by nw) is substantially less than the number of rows in $X_m$ (given by nl), as is the case for OES data. Since there are four sample matrices $X_1$, $X_2$, $X_3$, $X_4$ in the present embodiment, four matrices $U_1$, $U_2$, $U_3$, $U_4$ are obtained, as well as four matrices $V_1$, $V_2$, $V_3$, $V_4$ and four matrices $S_1$, $S_2$, $S_3$, $S_4$. At this stage, each matrix $U_m$ is of dimension (nl, nl) and is a set of singular vectors for its corresponding sample matrix $X_m$ (essentially an orthogonal set of coordinates) ordered so that the first singular vectors, $U_m$ (1:nl, 1, 2, 3, . . . ), lie in the "directions" (in the high dimensional wavelength space) of the largest variance in $X_m$. In Step 330, the number of singular vectors kept in $U_m$ is reduced to a set of principal singular vectors representing the largest variance in $X_m$, $U_m$ (1:nl, 1:np), where np<nl. Various statistical criteria familiar to practitioners of principal components analysis may be used to decide on the size of the parameter np, the number of principal singular vectors to retain in the matrix $U_m$.

In steps 320 and 330, if the plasma process fault detection module 100 has proceeded from step 310 to step 320, then the SVD is only performed for the dynamic model matrices $X_3$ and $X_4$ to obtain updated principal singular-vector matrices $U_3$ and $U_4$ for the dynamic models only.

In either the initial case or the recalculation case, after the required principal singular-vector matrices $U_m$ have been determined in steps 320 and 330, the plasma process fault detection module 100 proceeds to step 340.

In step 340, various data items (e.g., $X_m$ for each model, $U_m$ for each model, the normalized standard deviation values $\sigma norm_i$ for each model, the category assigned to each wafer for each of the dynamic models) are saved to a database file for subsequent analysis. The database file may, for example, be stored on the hard drive of the PMCU 24. In the present embodiment, a user may specify whether the data is to be saved in a Microsoft SQL format or a Microsoft Access format. However, numerous other formats are possible as well. Once saved, an appropriate database program may access the database file to perform functions such as querying, sorting and graphing the various data items and displaying wafer related information as well as the previously saved OES data obtained from a wafer.

After various model data is saved in step 340 or if directed thereto from steps 270 or 280, the plasma process fault detection module 100 undertakes step 350. In step 350 the current wafer index i is increased (e.g., by adding 1 to the current wafer index i). Thereafter, the plasma process fault detection module 100 returns to step 120.

Figure 4A:
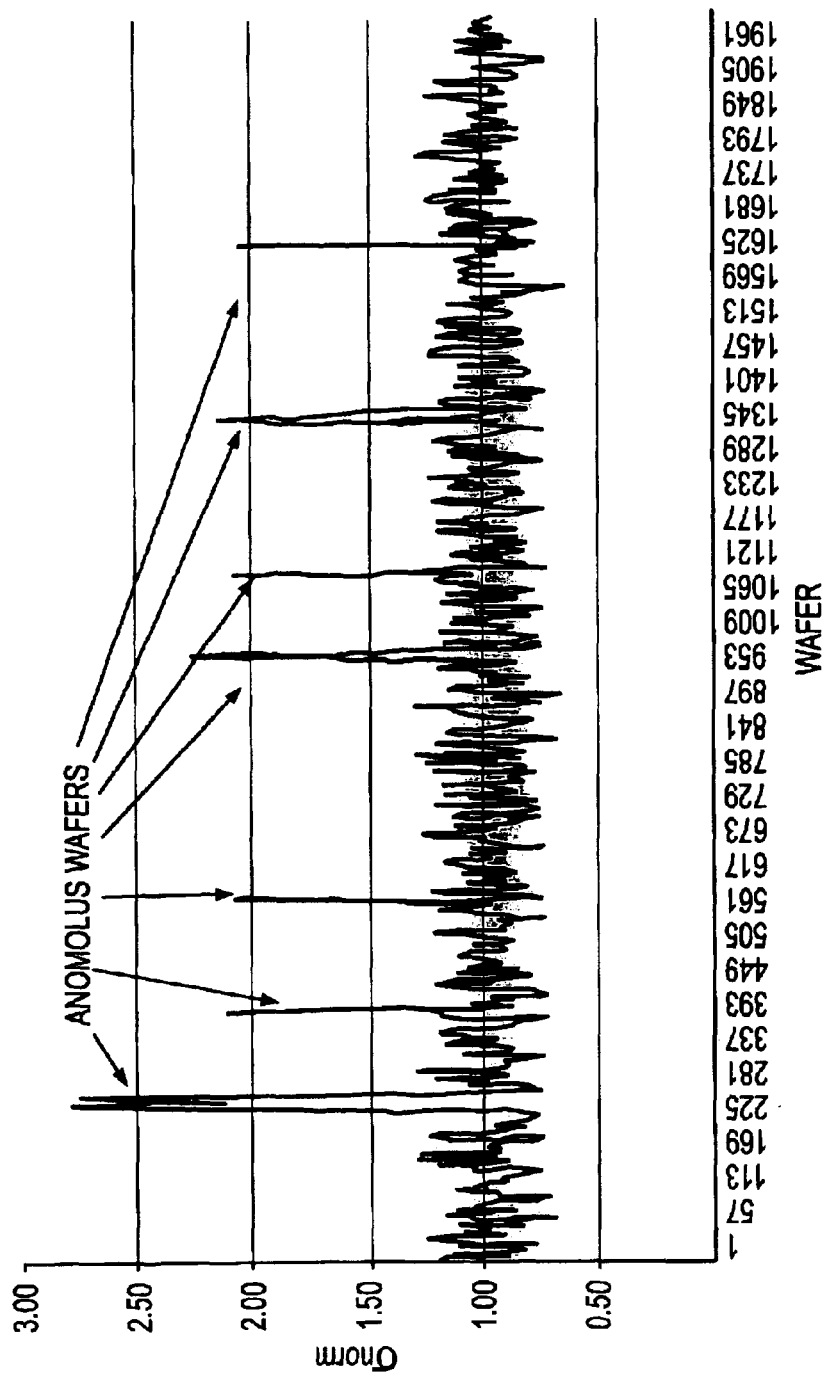
FIG. 4A is a plot showing exemplary normalized standard deviation values determined from a dynamically updated model obtained by the plasma process fault detection module for wafers that have undergone a plasma process.
Figure 4B:
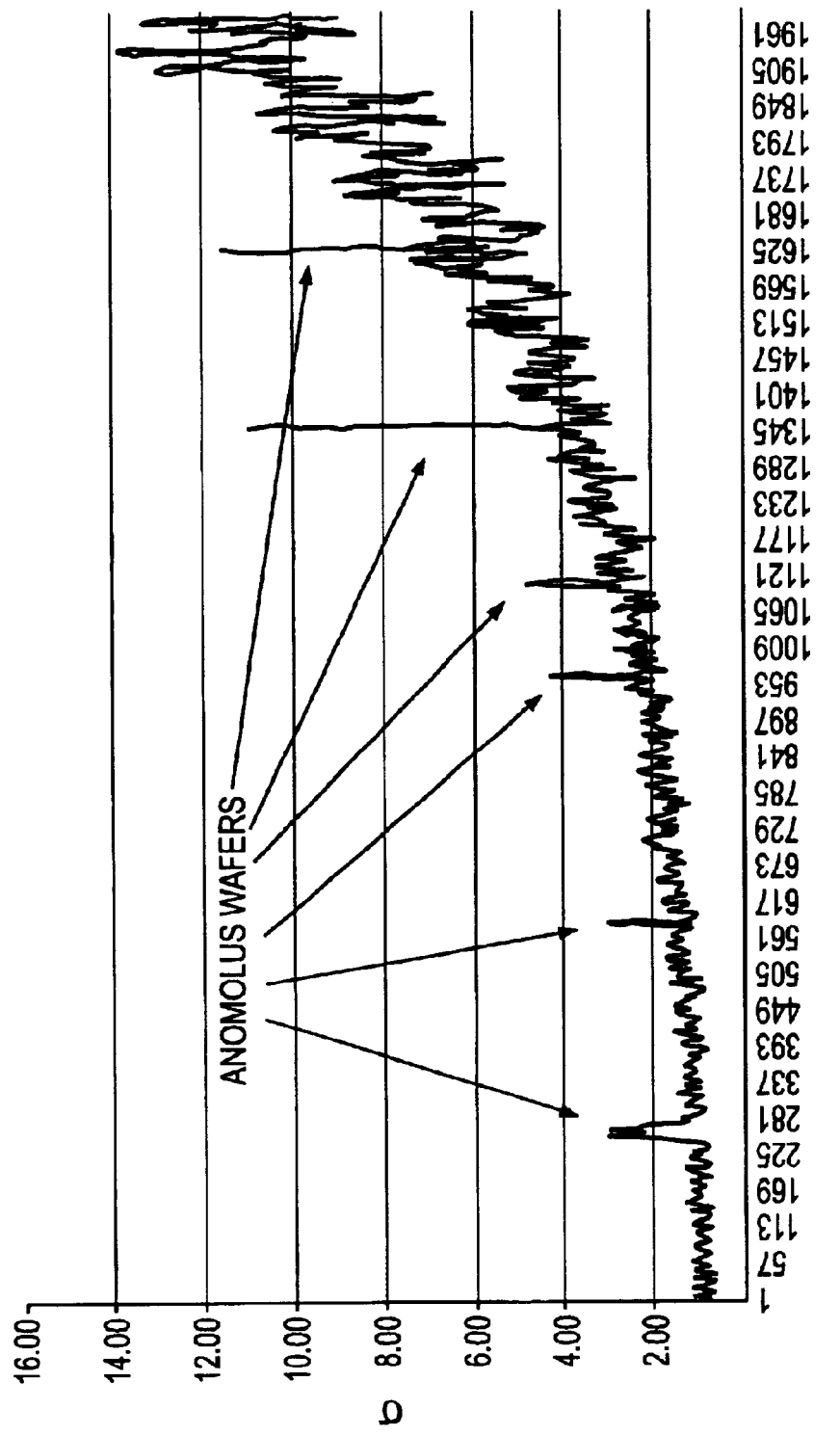
FIG. 4B is a plot showing exemplary normalized standard deviation values determined from a static model obtained by the plasma process fault detection module for wafers that have undergone a plasma process.

Referring now to FIGS. 4A–B, there are shown plots of exemplary normalized standard deviations $\sigma norm_i$ for a dynamic model (FIG. 4A) and exemplary normalized standard deviations $\sigma norm_i$ for a static model (FIG. 4B) obtained by the plasma process fault detection module 100 for a number of wafers that have undergone the same plasma process within a plasma processing chamber 12. As can be seen by comparing the plots, anomalous wafers are more readily identified from the normalized standard deviations $\sigma norm_i$ from the dynamic model than from the static model. Further, the plot in FIG. 4B shows how over time as the processing chamber 12 becomes increasingly dirty, the static-model normalized standard deviations $\sigma norm_i$ may significantly increase. This information may be utilized to identify when it is time to clean the processing chamber 12.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method for monitoring an industrial process, said method comprising the steps of:

obtaining sensor data corresponding to a plurality of product units being processed in accordance with the industrial process;

forming a sample matrix of data representing at least two of the product units, wherein the sample matrix is formed from at least a portion of the sensor data;

computing a plurality of singular vectors of the sample matrix;

reducing the plurality of singular vectors to a principal set of singular vectors;

computing principal components of sensor data corresponding to at least one additional product unit processed subsequent to the product units represented in the sample matrix;

computing a predicted data vector for the additional product unit;

calculating a residual data vector for the additional product unit using the predicted data vector for the additional product unit and a measured data vector corresponding to the additional product unit, the measured data vector comprising sensor data obtained for the additional product unit;

calculating a scalar metric from the residual data vector for the additional product unit; and categorizing the additional product unit based on the value of the scalar metric;

wherein said steps of obtaining sensor data, forming a sample matrix, computing a plurality of singular vectors, reducing the plurality of singular vectors, computing principal components, computing a predicted data vector, calculating a residual data vector, calculating a scalar metric, and categorizing the additional product unit are performed in real time as additional product units are processed in accordance with the industrial process.

2. The method of claim 1 wherein the industrial process comprises a plasma process and wherein the product units comprise semiconductor wafers.

3. The method of claim 2 wherein the sensor data comprises OES data.

4. The method of claim 1 wherein the sensor data comprises at least one of mass spectrometer data, electrical sensor data, and RF sensor data.

5. The method of claim 1 wherein said step of obtaining comprises:

selecting, for each product unit, a single sensor data vector corresponding to a time of interest.

6. The method of claim 5 wherein the time of interest corresponds to an endpoint of the industrial process performed on the product units.

7. The method of claim 1 wherein said step of obtaining comprises:

averaging, for each product unit, a plurality of sensor data vectors to obtain one average sensor data vector corresponding to each product unit.

8. The method of claim 7 wherein in said step of averaging, only data vectors obtained after a predetermined time from a start point of the industrial process performed on the product unit up to a predetermined time before an endpoint of the industrial process performed on the product unit are averaged.

9. The method of claim 1 further comprising the steps of:
updating the sample matrix by deleting from the sample matrix sensor data corresponding to at least one product unit obtained earlier in time and adding to the sample matrix sensor data corresponding to at least one product unit processed later in time;
periodically recomputing the singular vectors of the sample matrix; and
periodically reducing the singular vectors to a set of principal singular vectors.

10. The method of claim 1 wherein said step of categorizing comprises:
assigning the additional product unit to a first category if the scalar metric is within a first range;
assigning the additional product unit to a second category if the scalar metric is within a second range; and
assigning the additional product unit to a third category if the scalar metric is within a third range.

11. The method of claim 1 wherein said step of calculating a scalar metric comprises:
calculating the standard deviation of the residual data vector.

12. The method of claim 11 further comprising:
normalizing the standard deviation by an average standard deviation to obtain a normalized standard deviation corresponding to the additional product unit.

13. The method of claim 12 wherein said step of categorizing comprises:
assigning the additional product unit to a first category if the normalized standard deviation corresponding to the additional product unit is less than a first predetermined parameter;
assigning the additional product unit to a second category if the normalized standard deviation corresponding to the additional product unit greater than or equal to the first predetermined parameter and is less than a second predetermined parameter; and
assigning the additional product unit to a third category if the normalized standard deviation corresponding to the additional product unit is greater than or equal to than the second predetermined parameter.

14. The method of claim 13 wherein the value of the first predetermined parameter is 2.0 and the value of the second predetermined parameter is 3.0.

15. The method of claim 1 wherein said step of computing a plurality of singular vectors of the sample matrix comprises:
performing a singular value decomposition on the sample matrix to obtain the plurality of singular vectors.

16. The method of claim 1 wherein said step of calculating a residual data vector for the additional product unit comprises:
subtracting the predicted data vector for the additional product unit from the actual data vector corresponding to the additional product unit.

17. The method of claim 1 wherein said step of calculating a scalar metric from the residual data vector for the additional product unit is performed in real time as product units are undergoing the industrial process.

18. The method of claim 1 further comprising:
outputting on an output device at least one of the scalar metric and the category assigned to the additional product unit.

19. A method for monitoring a plurality of plasma processes, said method comprising the steps of:
obtaining sensor data for a plurality of wafers being processed in accordance with a plurality of plasma processes, wherein the sensor data is obtained at a plurality of times during the processing of each wafer;
forming at least one of a plurality sample matrices from at least a portion of the sensor data, wherein each sample matrix formed is associated with one of the plasma processes;
computing singular vectors for each sample matrix formed in said forming step;
reducing the singular vectors computed for each sample matrix to a principal set of singular vectors for each sample matrix, each sample matrix and its corresponding principal set of singular vectors comprising a model associated with the plasma process with which the sample matrix is associated;
storing each model associated with the plasma processes that the wafers are processed in accordance therewith;
associating an additional wafer processed subsequent to plasma processing of the wafers represented in the sample matrix with one of the plurality of plasma processes;
retrieving the model for the plasma process associated with the additional wafer;
computing principal components, a predicted data vector, and a residual data vector for the additional wafer, using the principal set of singular vectors from the retrieved model;
calculating a scalar metric from the residual data vector for the additional wafer;
categorizing the additional wafer based on the value of the scalar metric.

20. The method of claim 19 wherein said sensor data comprises OES data.

21. The method of claim 19 further comprising the step of:
identifying each plasma process by the processing chamber in use and the process recipe in use.

22. The method of claim 21 wherein, in said step of forming, at least one sample matrix is formed by selecting a single data vector at a time of interest during the processing of each wafer.

23. The method of claim 22 wherein the time of interest comprises an endpoint of the process.

24. The method of claim 22 further comprising the steps of:
updating the sample matrix of at least one model associated with each process by deleting from the sample matrix a data vector corresponding to at least one wafer processed earlier in time and adding to the sample matrix a data vector corresponding to at least one wafer processed later in time; and
periodically recomputing the singular vectors of the sample matrix; and
periodically reducing the singular vectors to a set of principal singular vectors.

25. The method of claim 21 wherein, in said step of forming, at least one sample matrix is formed by averaging a plurality of data vectors obtained during the processing of each wafer to obtain a single average data vector for each wafer.

26. The method of claim 25 wherein, in said step of forming, only data vectors obtained after a predetermined time from a start point of plasma processing of each wafer up to a predetermined time before an endpoint of plasma processing of each wafer are averaged to obtain the single average data vector for each wafer.

27. The method of claim 25 further comprising the steps of:
  updating the sample matrix of at least one model associated with each process by deleting from the sample matrix a data vector corresponding to at least one wafer processed earlier in time and adding to the sample matrix a data vector corresponding to at least one wafer processed later in time; and
  periodically recomputing the singular vectors of the sample matrix; and periodically reducing the singular vectors to a set of principal singular vectors.

28. The method of claim 19 wherein said step of storing comprises:
  saving each model associated with the plasma processes that the wafers are processed in accordance therewith in at least one of a computer memory and a recording medium.

29. The method of claim 19 wherein said step of calculating a scalar metric from the residual data vector for the additional product unit is performed in real time as wafers are plasma processed.

30. A system for use in monitoring industrial processes, said system comprising:
  a data selection module operable to obtain at least one data vector corresponding to each of a plurality of product units being processed;
  a sample matrix building module operable to build at least one sample matrix from data vectors corresponding to at least two of the product units;
  a principal component analysis module operable to compute principal singular vectors for a sample matrix input thereto, the sample matrix and principal singular vectors thereof comprising model data, said principal component analysis module being further operable to compute, from the principal singular vectors associated with the sample matrix input thereto, principal components, a predicted data vector, and a residual data vector for each additional product unit that is processed subsequent to processing of the product units represented in the sample matrix input thereto;
  a model maintenance module operable to identify a process identity for a product unit currently being processed from among a plurality of process identities, store model data associated with the identified process identity, and retrieve stored model data associated with the identified process identity; and
  a product unit categorization module operable to categorize each additional product unit that is processed subsequent to processing of the product units represented in the sample matrix based a scalar metric calculated from each residual data vector for each additional product unit.

31. The system of claim 30 wherein said data selection module is operable to obtain at least first and second data vectors corresponding to each of a plurality of product units being processed, said first data vector comprising a single original data vector occurring at a time of interest, and said second data vector comprising an average of a plurality of original data vectors occurring over a specified range of times in the process.

32. The system of claim 31 wherein said sample matrix building module is operable to build at least one of a first sample matrix comprising first data vectors, a second sample matrix comprising second data vectors, a third sample matrix comprising first data vectors and a fourth sample matrix comprising second data vectors, wherein said first and second sample matrices remain intact after being initially built, and wherein said third and fourth sample matrices are updated after being initially built.

33. The system of claim 32 wherein said third sample matrix is updated by deleting a first data vector therefrom corresponding to a product unit processed earlier in time and adding a third data vector thereto corresponding to a product unit processed later in time.

34. The system of claim 32 wherein said principal component analysis module is operable to compute principal singular vectors for said first, second, third and fourth sample matrices, said principal component analysis module being further operable to compute, from the principal singular vectors associated with the first, second, third, and fourth sample matrices, principal components, a predicted data vector, and a residual data vector for each additional product unit that is processed subsequent to processing of the product units represented in the sample matrix input thereto.

35. The system of claim 34 wherein said model maintenance module is operable to:
  store first, second, third and fourth models associated with the identified process identity, wherein said first model comprises the first sample matrix and associated principal singular vectors for the identified process identity, said second model comprises the second sample matrix and associated principal singular vectors for the identified process identity, said third model comprises the third sample matrix and associated principal singular vectors for the identified process identity, and said fourth model comprises the fourth sample matrix and associated principal singular vectors for the identified process identity, and
  retrieve said first, second, third, and fourth models associated with said process identity identified with each of said plurality of product units being processed.

36. The system of claim 30 further comprising:
  a data output module operable to output on an output device at least one of the scalar metric calculated from each residual data vector for each additional product unit and the category assigned to each additional product unit based on the calculated scalar metric.

37. The system of claim 36 wherein said output device comprises at least one of a display screen, a printer, and a plotter.

38. The system of claim 30 wherein said data selection module, said sample matrix building module, said principal component module, said model maintenance module, and said product unit categorization module comprise a computer program executable by a microprocessor.

39. The system of claim 30 wherein said data selection module is operable to obtain at least one data vector corresponding to each of a plurality of product units being processed in real time as each product unit is processed.

40. The system of claim 30 wherein said principal component analysis module is operable to compute the principal components, the predicted data vector, and the residual data vector for each additional product unit that is processed subsequent to processing of the product units represented in the sample matrix input thereto in real time as each additional product unit is processed.

41. The system of claim 30 wherein the industrial processes comprise plasma processes and wherein the product units comprise semiconductor wafers.

42. The system of claim 41 wherein the data vector comprises OES data.

43. The system of claim 30 wherein the data vector comprises at least one of mass spectrometer data, electrical sensor data, and RF sensor data.

44. A method for monitoring an industrial process, said method comprising the steps of:

- obtaining sensor data corresponding to a plurality of product units being processed in accordance with the industrial process, wherein said step of obtaining comprises averaging, for each product unit, a plurality of sensor data vectors to obtain one average sensor data vector corresponding to each product unit;
- forming a sample matrix of data representing at least two of the product units, wherein the sample matrix is formed from at least a portion of the sensor data;
- computing a plurality of singular vectors of the sample matrix;
- reducing the plurality of singular vectors to a principal set of singular vectors;
- computing principal components of sensor data corresponding to at least one additional product unit processed subsequent to the product units represented in the sample matrix;
- computing a predicted data vector for the additional product unit;
- calculating a residual data vector for the additional product unit using the predicted data vector for the additional product unit and a measured data vector corresponding to the additional product unit, the measured data vector comprising sensor data obtained for the additional product unit;
- calculating a scalar metric from the residual data vector for the additional product unit; and
- categorizing the additional product unit based on the value of the scalar metric.

45. A method for monitoring an industrial process, said method comprising the steps of:

- obtaining sensor data corresponding to a plurality of product units being processed in accordance with the industrial process;
- forming a sample matrix of data representing at least two of the product units, wherein the sample matrix is formed from at least a portion of the sensor data;
- computing a plurality of singular vectors of the sample matrix;
- reducing the plurality of singular vectors to a principal set of singular vectors;
- computing principal components of sensor data corresponding to at least one additional product unit processed subsequent to the product units represented in the sample matrix;
- computing a predicted data vector for the additional product unit;
- calculating a residual data vector for the additional product unit using the predicted data vector for the additional product unit and a measured data vector corresponding to the additional product unit, the measured data vector comprising sensor data obtained for the additional product unit;
- calculating a scalar metric from the residual data vector for the additional product unit;
- categorizing the additional product unit based on the value of the scalar metric;
- updating the sample matrix by deleting from the sample matrix sensor data corresponding to at least one product unit obtained earlier in time and adding to the sample matrix sensor data corresponding to at least one product unit processed later in time;
- periodically recomputing the singular vectors of the sample matrix; and
- periodically reducing the singular vectors to a set of principal singular vectors.

* * * * *